US012615219B2

(12) United States Patent
Hedden et al.

(10) Patent No.: US 12,615,219 B2
(45) Date of Patent: Apr. 28, 2026

(54) DYNAMIC RESOURCE CONFIGURATION, MANAGEMENT, AND CONTROL

(71) Applicant: NCR Voyix Corporation, Atlanta, GA (US)

(72) Inventors: Duncan McDonald Hedden, Newnan, GA (US); Lucas Edward Smith, Dunwoody, GA (US)

(73) Assignee: NCR Voyix Corporation, Atlanta, GA (US)

( * ) Notice: Subject to any disclaimer, the term of this patent is extended or adjusted under 35 U.S.C. 154(b) by 112 days.

(21) Appl. No.: 18/401,540

(22) Filed: Dec. 31, 2023

(65) Prior Publication Data

US 2025/0219962 A1 Jul. 3, 2025

(51) Int. Cl.
*G06F 15/173* (2006.01)
*H04L 47/70* (2022.01)
*H04L 47/78* (2022.01)

(52) U.S. Cl.
CPC .......... *H04L 47/781* (2013.01); *H04L 47/822* (2013.01); *H04L 47/826* (2013.01)

(58) Field of Classification Search
CPC .... H04L 47/781; H04L 47/822; H04L 47/826
See application file for complete search history.

(56) References Cited

U.S. PATENT DOCUMENTS

| | | | |
|---|---|---|---|
| 10,277,526 B2 | 4/2019 | Spatzier et al. | |
| 2021/0397729 A1* | 12/2021 | McQuaid ............ | G06F 21/6218 |

| | | | |
|---|---|---|---|
| 2023/0164038 A1 | 5/2023 | Epstein | |
| 2023/0244392 A1* | 8/2023 | Jain ........................ | G06F 3/0631 |
| | | | 711/154 |
| 2023/0315496 A1* | 10/2023 | Cravens .................... | G06F 8/60 |
| | | | 715/765 |

FOREIGN PATENT DOCUMENTS

| | | |
|---|---|---|
| CN | 114730258 | 7/2022 |
| WO | 2016053518 | 4/2016 |
| WO | 2021150307 | 7/2021 |

OTHER PUBLICATIONS

"European Application Serial No. 24211685.3, Extended European Search Report mailed Apr. 3, 2025", 9 pgs.

* cited by examiner

*Primary Examiner* — Joseph R Maniwang
(74) *Attorney, Agent, or Firm* — Schwegman Lundberg & Woessner, P.A.

(57) ABSTRACT

Distributed resource configuration, management, and control are provided through a frontend user interface, an application programming interface (API), and backend operations. Collections of configured and managed resources provide cloud services from a cloud environment to enterprise servers. A user provides resource definitions for resource types through the user interface. The backend operations translates the definitions into one or more low-level resource management API calls, which cause the resources to be configured, deployed, reserved/created, and controlled on one or more distributed devices. The configured resource of the distributed devices provide the cloud services to the enterprise servers. In an embodiment, a single user session via the user interface permits the user to deploy multiple instances of a resources within a corresponding environment.

7 Claims, 3 Drawing Sheets

200

210
RENDER A USER INTERFACE TO AN
ENVIRONMENT THAT INCLUDES RESOURCES

220
RECEIVE RESOURCE CONFIGURATION
SETTINGS FOR THE RESOURCES FROM A
USER DURING A SESSION

230
TRANSLATE THE RESOURCE
CONFIGURATION SETTINGS INTO
APPLICATION PROGRAMMING INTERFACE
(API) CALLS ASSOCIATED WITH THE
ENVIRONMENT

240
CONTROL DEPLOYMENT, DELETION, AND
RESERVATION OF THE RESOURCES USING
THE API CALLS

250
PROCESS 21-240 AS A FRONT-END
INTERFACE TO A LOW-LEVEL API THAT
PROVIDES RESOURCE MANAGEMENT
FOR THE RESOURCES OF THE
ENVIRONMENT

251
PROCESS 210-250 AS A FURTHER FRONT-
END INTERFACE TO A THIRD-PARTY API,
THE THIRD-PARTY API INTERACTS WITH
THE LOW-LEVEL API AND PERFORMS
RESOURCE MANAGEMENT FOR THE
RESOURCES IN THE ENVIRONMENT

221
IDENTIFY IN THE CONFIGURATION SETTINGS
A CERTAIN RESOURCE THAT THE USER IS
REQUESTING DURING THE SESSION TO BE
DEPLOYED AS MULTIPLE INSTANCES OF THE
CERTAIN RESOURCE WITHIN THE
ENVIRONMENT

231
CAUSE A RESOURCE TIME OUT FOR THE
ENVIRONMENT TO BE OVERRIDDEN TO PERMIT
ADDITIONAL TIME TO DEPLOY THE INSTANCES

232
MANAGE THE API CALLS BEING DIRECTED TO A
LOW-LEVEL API ASSOCIATED WITH RESOURCE
MANAGEMENT OF THE ENVIRONMENT

233
MANAGE THE API CALLS BEING DIRECTED TO A
THIRD-PARTY API THAT INTERACTS WITH A
LOW-LEVEL API ASSOCIATED WITH RESOURCE
MANAGEMENT OF THE ENVIRONMENT

241
MONITOR UTILIZATION OF THE RESOURCES
WITHIN THE ENVIRONMENT AFTER THE
RESERVATION AND DEPLOYMENT OF THE
RESOURCES USING A LOW-LEVEL API
ASSOCIATED WITH THE ENVIRONMENT

242
RESERVE AND DEPLOY NEW RESOURCES
WITHIN THE ENVIRONMENT BASED ON USER
DEFINED MAXIMUMS AND MINIMUMS SET FOR
RESOURCE UTILIZATION AND BASED ON 241

243
DELETE EXISTING RESOURCES WITHIN THE
ENVIRONMENT BASED ON THE MAXIMUMS AND
MINIMUMS AND BASED ON 241

244
AUTO SCALE THE RESOURCES BASED ON
MONITORING THE RESOURCES

245
MAINTAIN A MANAGEMENT FILE WITH RESOURCE
NAMES AS THE RESOURCES ARE DEPLOYED AND
DELETED FROM THE ENVIRONMENT

246
MAINTAIN THE MANAGEMENT FILE AS A TEXT
FILE TO MANAGE THE RESOURCES AND
INSTANCES OF THE RESOURCES

FIG. 2

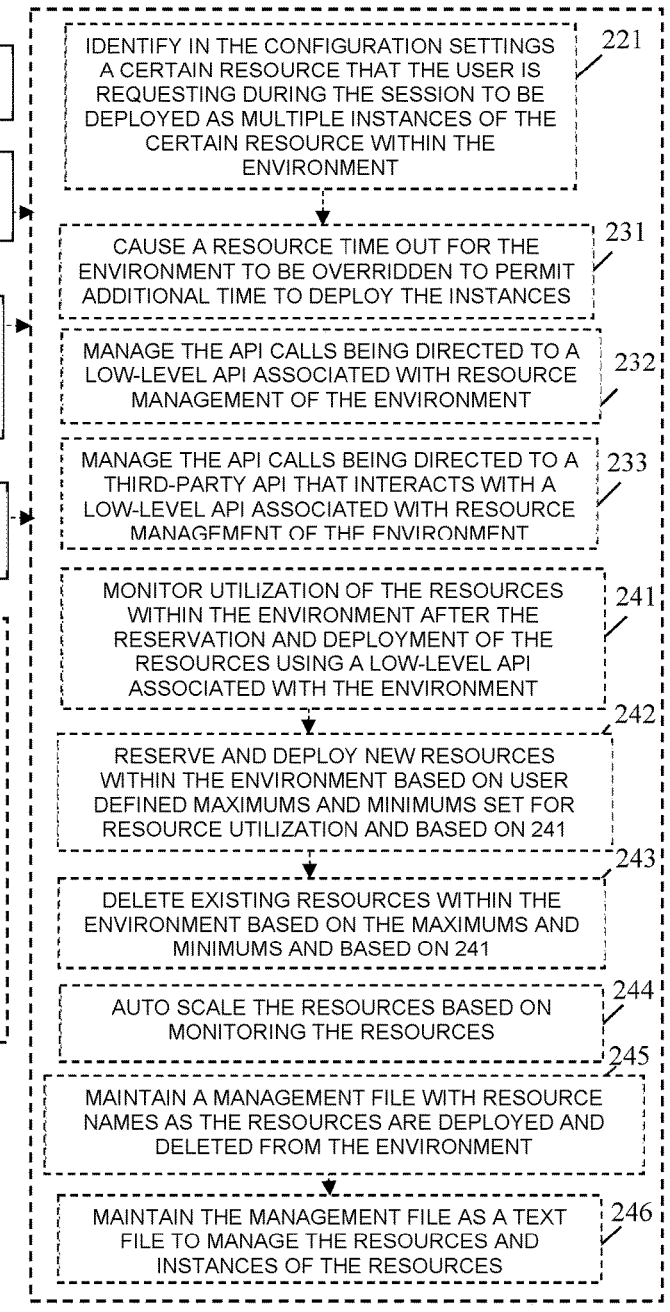

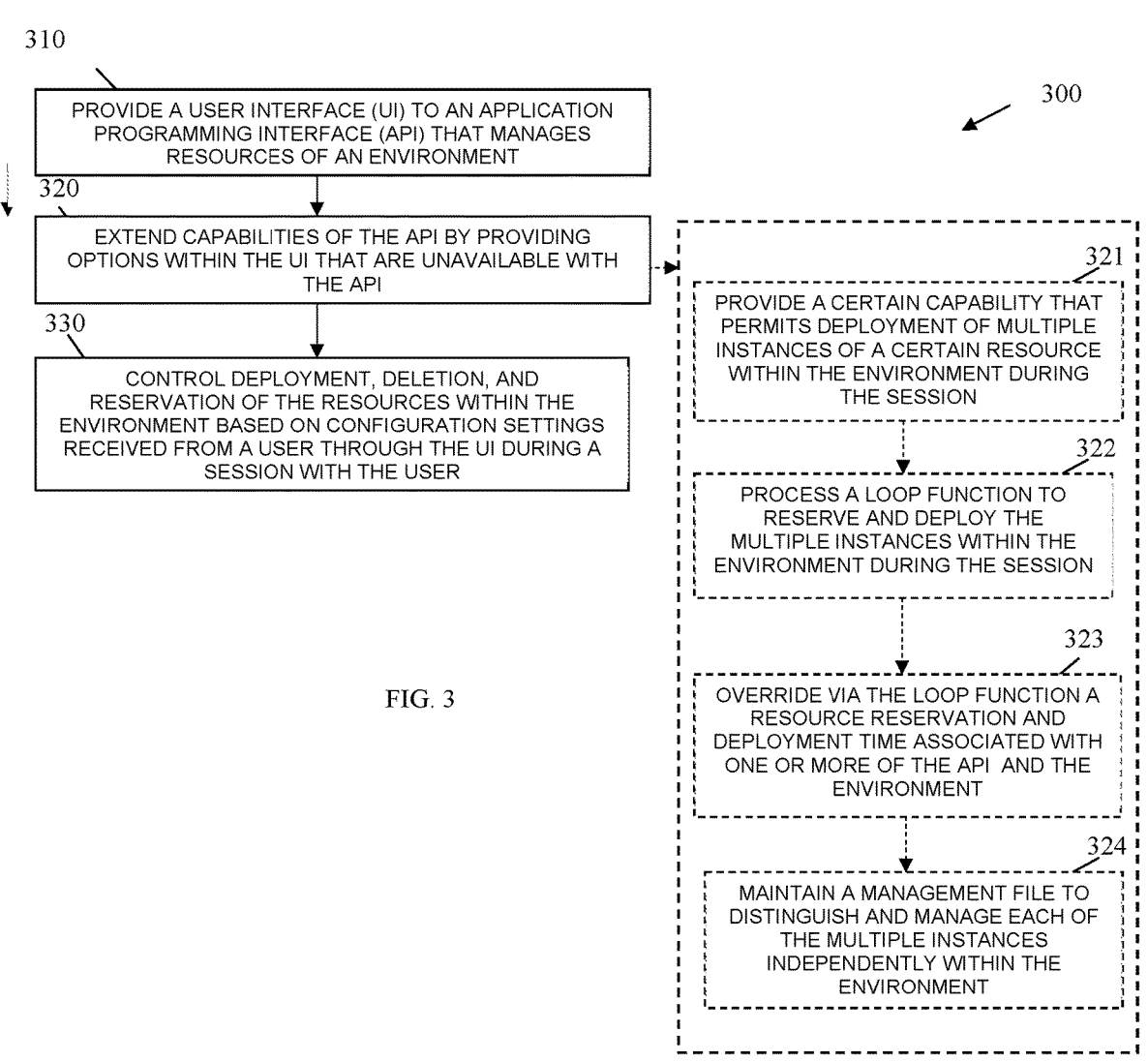

310

PROVIDE A USER INTERFACE (UI) TO AN APPLICATION
PROGRAMMING INTERFACE (API) THAT MANAGES
RESOURCES OF AN ENVIRONMENT

320

EXTEND CAPABILITIES OF THE API BY PROVIDING
OPTIONS WITHIN THE UI THAT ARE UNAVAILABLE WITH
THE API

330

CONTROL DEPLOYMENT, DELETION, AND
RESERVATION OF THE RESOURCES WITHIN THE
ENVIRONMENT BASED ON CONFIGURATION SETTINGS
RECEIVED FROM A USER THROUGH THE UI DURING A
SESSION WITH THE USER

300

321

PROVIDE A CERTAIN CAPABILITY THAT
PERMITS DEPLOYMENT OF MULTIPLE
INSTANCES OF A CERTAIN RESOURCE
WITHIN THE ENVIRONMENT DURING
THE SESSION

322

PROCESS A LOOP FUNCTION TO
RESERVE AND DEPLOY THE
MULTIPLE INSTANCES WITHIN THE
ENVIRONMENT DURING THE SESSION

323

OVERRIDE VIA THE LOOP FUNCTION A
RESOURCE RESERVATION AND
DEPLOYMENT TIME ASSOCIATED WITH
ONE OR MORE OF THE API  AND THE
ENVIRONMENT

324

MAINTAIN A MANAGEMENT FILE TO
DISTINGUISH AND MANAGE EACH OF
THE MULTIPLE INSTANCES
INDEPENDENTLY WITHIN THE
ENVIRONMENT

FIG. 3

DYNAMIC RESOURCE CONFIGURATION, MANAGEMENT, AND CONTROL

BACKGROUND

Several commercially available cloud platforms utilize Kubernetes® Engine for deploying, managing, and scaling software testing automation systems. These automation systems are highly valuable in performing tasks specified by a user. The current solutions are severely limited by requiring manual user intervention for provisioning. Manual provisioning of cloud resources has limitations on scaling automated quality tests which limit how many resources can process and which slow engineering processes. Manual testing also leads to more product defects, lower customer satisfaction, and higher support costs. Furthermore, manual provisioning of cloud resources has limitations in simulating complex production environments.

BRIEF DESCRIPTION OF THE DRAWINGS

FIG. 2 is a diagram of a method for dynamic resource configuration, management, and control, according to an example embodiment.

FIG. 3 is a diagram of another method for dynamic resource configuration, management, and control, according to an example embodiment.

DETAILED DESCRIPTION

Figure 1:
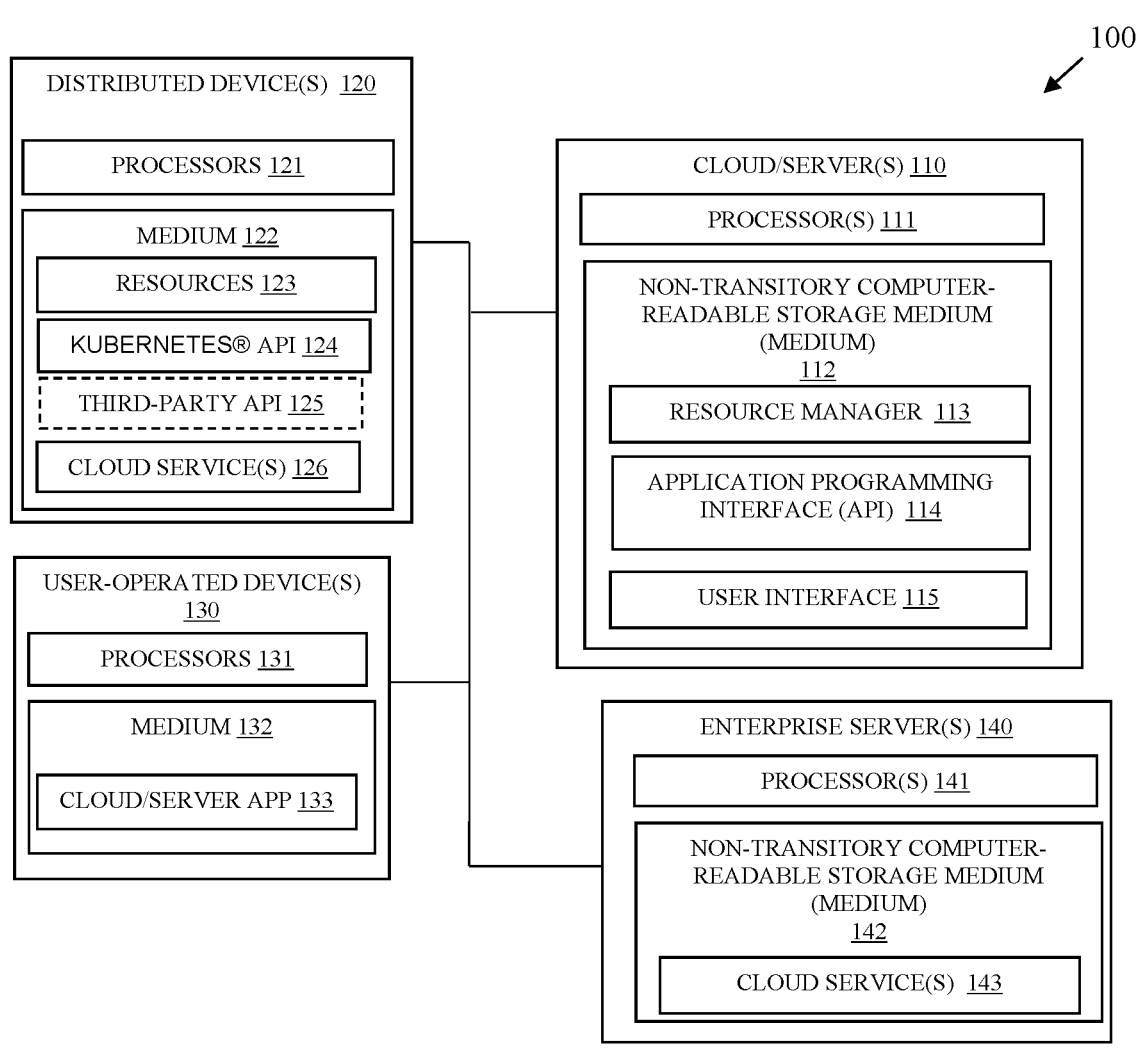
FIG. 1 is a diagram of a system for dynamic resource configuration, management, and control, according to an example embodiment.

As mentioned above several commercially available software products attempt to automated interaction with Kubernetes® Engine. For example, Google's® Kubernetes® Engine (GKER) is an application programming interface (API) provided with Google's® Cloud Platform (GCP®) which automates various low-level interactions required of a user when using the API associated with Kubernetes® Engine. One such automation provided by the GKER API is node scaling, which is designed to dynamically allocate GCP® resources at any level dependent on a current need of a product. The node scaling feature of GKE® can determine the appropriate number of GCP® resources to provide dependent on the requests made for a given cluster of resources, a node pool of resources, or node of resources. Similarly, GKER automatically scales down GCP® resources and deletes resources to prevent customer billing associated with unused resources.

However, there are several limitations associated with GKE® API and other commercially available APIs that attempt to automate the low-level API interaction required by the API of Kubernetes® Engine. For example, GKER does not allow for multiple instances of node pools to be deployed at a same time. Thus, a node pool of 5 nodes can take approximately 120 seconds to deploy, when there are 5 node pools this means approximately 600 seconds or 10 minutes is required to deploy all 5 node pools. Furthermore, each deployment of each node pool requires manual user interaction with the GKER API even though the node pools are different instances of a same node pool. This is but one example of limitations associated with commercially available front-end APIs to Kubernetes® Engine.

The teachings provided herein solves the aforementioned issues and others associated with automating low-level interactions with Kubernetes® Engine. The teachings provide automation and corresponding features and function for configuring, managing, and controlling resources. In an embodiment, the novel features and function utilize existing third-party APIs to the Kubernetes® Engine. In an embodiment, the novel features and function utilize a new and novel API to the Kubernetes® Engine.

At least four features and corresponding functions are presented that all interact with one another. There are features and corresponding functions to 1) deploy the resources, 2) delete the resources; 3) get current resources in a cluster, pool, and/or node; and 4) control each of 1)-3). Initially, the user is authenticated for direct interaction and control of a cloud environment. Once a user account is authenticated, the user is permitted through a user interface to create a certain type of resource, such as a node pool or node. The user provides certain configurations and characteristics to the resources provided; for example, where to deploy the resource or the type of virtual machines (VMs) to use.

When this request is approved, a configurable number of resources can be made/reserved within the environment. For instance, a user can deploy 5 node pool instances using one node pool and corresponding resources definition provided by the user within the user interface (e.g., one user interface interaction or session with the user interface), these node pool instances can individually be deployed with, for example, 10 nodes within each of them. The status of the pool instances being deployed are monitored. The functions associated with creating and deploying resources are similarly used for the resource deletion feature of the API and user interface.

A loop-based function deploys the pool instances using a monitored constraint associated with a predefined reservation/creation time associated with the environment. The predefined reservation/creation time is the amount of hardcoded time for a resource to be reserved/created within the environment. The loop-based function combined with the known a length of the environment's time out effectively overrides the environment's hardcoded reservation/creation time and provides more time for multiple instances of resources or pool instances to be created within the environment without experiencing an environment timeout. This loop-based function also enhances the feature/function of third-party APIs that provide a high-level interface to the Kubernetes® API.

For example, using the example presented above if there are 5 node pool instances of 5 nodes having a known environment creation/reservation time out of 120 seconds, then the total expected elapsed time to create/reserve the 1 pool instance within the environment is 600 seconds (i.e., 5 resources in each pool instance, 5 multiplied by 120 seconds is 600 seconds). The monitored time constraint is equal to the square root of 600 seconds multiplied by 5 (i.e., the total number of pool instances), which equals approximately $\frac{1}{5}^{th}$ the time required with the GKER API (i.e., 120 seconds per resource multiplied by 5 resources in each pool instance is equal to 600 seconds, the square root of 600 is approximately 24.5 seconds, which when multiplied by 5 pool instances is equal to approximately 125 seconds). The loop-based function effectively overrides the environment's time out for resource creation/reservation providing the user more time to deploy instances of resources within the environment. This is turn permits a feature that allows the user the capability to deploy multiple pool instances from a single session with a user interface, which is not currency available in the industry.

In an embodiment, the reservation/creation of current resources feature creates a text file used by the control feature as each resource is created, reserved, and deployed. This allows differentiation during resource deployment and deletion of different resource instances. The file includes all names of the resources. This also permits different instances of the resources to be processed in parallel in multiple environments using the text file to differentiate each of the resource instances in each of the environments.

The resources are auto scaled at every level by the control feature, which monitors the central processing unit (CPU) usage for every resource being deployed, deleted, and created/reserved. A predefined CPU usage percentage minimum and maximum causes either deployment of a new resource to keep up with the need for additional resources or causes deletion of a resource when it is being underutilized or unused.

As used herein, a "node" includes a physical machine and/or a VM. A "pool of nodes" includes a grouping of nodes with a same configuration of resources such that resources are shared within the pool to avoid unnecessary creation and deletion of resources. A "cluster" includes a collection of nodes that serve concurrent clients for failover, redundancy, and high availability (HA). A "pod" is the smallest deployable unit available in the Kubernetes® Engine and is a group of one or more containers, with shared storage and network resources along with a specification for how to process the container. A "resource" includes a node, a pool of nodes, a cluster, a pod, an application, a system, a collection of applications, a collection of systems, a workflow that includes one or more workloads, applications and/or systems, and/or a collection of workflows. A "resource type" identifies one of the aforementioned resources. An "instance of a resource" is a duplicated resource of an original defined resource, which processes in parallel or concurrently within a same processing environment or within multiple processing environments.

FIG. 1 is a diagram of a system/platform 100 (hereinafter just system 100") for dynamic resource configuration, management, and control, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of dynamic resource configuration, management, and control presented herein and below.

System 100 provides a user interface, an API, and functions that support resource creation/reservation features, resource deployment features, resource deletion features, resource monitoring features, and control features of resource creation/reservation, resource deployment, and resource deletion via resource monitoring within one or more processing environments. The user interface, API, features, and corresponding functions are now discussed with reference to the components of system 100 illustrated in FIG. 1.

System 100 includes a cloud/server 110 (hereinafter just "cloud 110"), a plurality of distributed devices 120, a plurality of user-operated devices 130, and a plurality of enterprise servers 140. Cloud 110 includes at least one processor 111 and a non-transitory computer-readable storage medium (hereinafter just "medium") 112, which includes instructions for a resource manager 113, an API 114, and a user interface 115. The instructions when provided to and executed by processor 111 cause processor 111 to perform processing, functions, and/or operations discussed herein and below with respect to 113-116.

Each distributed device 120 includes at least one processor 121 and a medium 122, which includes instructions for resources 123, a Kubernetes® API 124, optionally a third-party API 125, and a plurality of cloud services 126. The instructions when provided to and executed by processor 121 cause processor 121 to perform the processing, functions, and/or operations discussed herein and below with respect to 123-126.

Each user-operated device (hereinafter just "device") 130 includes at least one processor 131 and a medium 132, which includes instructions for cloud/server (hereinafter just "cloud") application (herein after just "app") 133. The instructions when provided to and executed by processor 131 from medium 132 cause processor 131 to perform the processing, functions, and/or operations discussed herein and below with respect to 133.

Each enterprise server 140 includes at least one processor 141 and medium 143, which includes instructions for one or more cloud services 143 The instructions when provided to and executed by processor 141 from medium 142 cause processor 141 to perform the processing, functions, and/or operations discussed herein and below with respect to 143.

Resource manager 113 includes user interface 115 as a front-end interface, which is rendered via cloud/server app 133 during user sessions between a user operating device 130 and resource manager 113 of cloud 110. Resource manager 113 obtains configuration settings selected and/or entered by the user during the session through user interface screens or user interface 115. The configuration settings define constraints and requirements for resources 123. The resources 123 when processed within a given processing environment or multiple processing environments cooperate to provide cloud services 126. Cloud services 143 access cloud services 126 from enterprise servers 140.

In an embodiment, cloud services 126 provide a transaction system or transaction services via cloud service 126 to enterprise servers 140 and enterprise devices, such as transaction terminals. In an embodiment, the transaction system, provided via cloud services 126, includes a plurality of microservices for transaction processing, transaction security services, transaction monitoring services, transaction logging services, customer loyalty services, etc. In an embodiment, the cloud services 126 cooperate to provide any combination of a transaction system/transaction services, an inventory system/inventory services, a security system/security services, and a customer loyalty system/customer loyalty services, any combination of which is provided from the environment(s) to enterprise servers 140 servers via cloud service 143.

Resource manager 113 translates and converts the configuration settings into corresponding Kubernetes® API commands by processing operations and functions, described herein, and issuing Kubernetes® API calls using backend API 114 sent to the Kubernetes® API 124. The functions and operations provide for deploying resources 123, deleting resources, 123, getting/creating/reserving current resources 123, and controlling the deployment, the deletion, and creating/getting/obtaining of the resources 123 via environment management information.

In an embodiment, resource manager 113 translates and converts the configuration settings into a third-party API 125, such as a GKER API. The third-party API 125 then interacts with Kubernetes® API 124 to deploy the resources within the environment(s). In an embodiment, resource manager 113 translates configuration settings provided via user interface 115 into commands and calls associated with both the Kubernetes® API 124 and the third-party API 125.

Resource manager 113 provides options within the user interface 115, which is rendered to a user via cloud app 133, to deploy multiple instances of a same resource during a single user session. That is, in a single user session can define a resource for reservation and deployment within a single environment or multiple environments as multiple concurrent instances. This is not available via existing third-party APIs.

In an embodiment, resource manager 113 uses a loop-based function with a third-party API 125 associated with the environment(s) in response to a user option to deploy multiple instances of a resource 123 within the environment (s). the loop-based function overrides an environment resource reservation/creation time out to extend the time out, which in turn permits multiple instances of a resource to be created/reserved and deployed within the environment via a single user session with user interface 115. Example, pseudocode that the resource manager performs to provide the loop-based function is as follows:

```
NUMBER_OF_RESOURCES_TO_DEPLOY = 100
AMOUNT_OF_TIME_BEFORE_TIMEOUT = 120 seconds
// Provides the square root of x^2 seconds times the number of
designated
    // resources to be deployed. The purpose is to provide
handling for larger resources to be deployed to prevent
    // exponential growth in those situations while still providing a
marginal increase to the timeout time.
    function timeoutTimeConversion( ) {
    sqrtConversion =
    math. Sqrt(AMOUNT_OF_TIME_BEFORE_TIMEOUT *
    NUMBER_OF_RESOURCES_TO_DEPLOY)
        return sqrtConversion
    }
    function deploy_cloud_resources( ) {
        // cloudAPI refers to the API creation of virtual machines
        while(i = 0; i <
NUMBER_OF_RESOURCES_TO_DEPLOY; i++) {
            for resource in cloudAPI.getResources( ) {
            // checkStatus will poll the desired
resources status state until the timeoutTimeConversion is met.
            // This will block the next resource creation
until the current resource is ready.
            checkStatus(timeoutTimeConversion,
resource)
            cloudAPI.createResource( )
        }
    }
}
```

In this way, the third-party API 125 is enhanced via the user interface option and resource manager 113 since resource manager 113 performs a feature or function not available with the third-party API 125 by effectively overriding a hardcoded resource creation/reservation/deployment time out and extending it in a manner that permits a user to use a single session and deploy multiple resource instances uses through a single session with resource manager 113 via user interface 115.

At the start of a session between the user and resource manager 113, resource manager 113 authenticates the user for access to the environment or environment(s) via user interface 115. Resource manager 113 initiates a session with third-party API 125 or environment APIs using the user's provided credentials. So, the session between the user and resource manager 113 is managed separately as a session between resource manager 113 and the environment(s). Once the user session with resource manager 113 is established and authenticated by the environment(s), resource manager 113 has access to the environment(s) for configuring, deploying, deleting, getting/creating/reserving, and controlling resources 123 for the user based on user defined configuration settings provided through user interface screens and environment management information.

The resource configuration settings include, by way of example only, resource types, hardware settings, management policies, environment identifiers, resource image types, resource identifiers, CPU types, boot disk sizes, memory requirements, concurrent session requirements, whether boot disk encryptions are enabled or not, provisioning models used, a total number of nodes being requested, whether autoscaling is on or off, any node zones, deployment schedules, and/or whether compact placement is being requested or not. Resource manager 113 translates or converts the configuration settings defined by the user into metadata recognized by Kubernetes® API 124 and/or third-party API 125. Notably, other configuration settings associated with customized management settings and/or policies can also be provided via field selections to the user via user interface screens. The customized managements settings and/or policies can include multiple low-level configuration settings packaged and identified via a name associated with the corresponding settings and/or policies.

When the user is reserving/initiating/getting multiple instances of a same resource 123 for deployment, resource manager 113 processes the loop-based function described above. As each resource instance is created, reserved, and deployed, resource manager 113 writes a resource name for each instance and/or its environment identifier into a text file once each instance creation, reservation, and deployment is confirmed by the environment. This ensures that a given instance is properly reserved/initiated before a next instance is sent to the environment via the third-party API 125 and/or Kubernetes® API 124. Essentially, a next instance of the resource 123 being reserved/initiated is blocked until confirmation is received that the prior instance of the resource 123 was reserved/initiated. Conventionally, the environment would time out once the hardcoded reservation time out is reached for the number of resources or resource instances being deployed. This time out period is extended by the loop-based function to be the square root of the product of the time out multiplied by the total number of resources being deployed. By extending the time out period of the environment, resource manager 113 provides a single user session with an ability or a feature to deploy multiple pools of resource instances, which has conventionally not been possible.

Resource manager 113 handles resource deletions similarly to how resource creation, reservation, and deployment are handled. The resource manager 113 uses the text file to manage deletion of instances of resources.

Resource manager 113 also is continuously obtaining management information for the deployed resources 123 from the environment using Kubernetes® API 124 and/or a third-party API 125. User set constraints are for maximums and minimums are monitored and the resources 123 are auto scaled. Thus, resource manager 113 will deploy a new resource 123 to keep up with demand for the resource being experienced by cloud services 126 (i.e., a maximum constraint is detected within the environment) and/delete resources 123 when demand for a resource by cloud services 126 wanes (i.e., a minimum constraint is detected within the environment).

System 100 permits dynamic cluster/node pool deployment, dynamic cluster/node pool management, dynamic cluster/node pool deletion, an ability to specify machine specifications, and an ability to assign taints/labels for simulating production environments. This is achieved with integration to the Kubernetes® API 124 and/or third-party APIs 125 that provide a high level interface to the Kubernetes® API 124. A user interface 115 permits a single user session with resource manager 113. Resource manager 113 performs resource deployment, deletion, creation/reservation, and control of deployment, deletion, and creation/reservation.

The above-referenced embodiments and other embodiments are now discussed with reference to FIGS. 2 and 3. FIG. 2 is a diagram of a method 200 for dynamic resource configuration, management, and control, according to an example embodiment. The software module(s) that implements the method 200 is referred to as a "resource manager." The resource manager is implemented as executable instructions programmed and residing within memory and/or a non-transitory computer-readable (processor-readable) storage medium and executed by one or more processors of one or more devices. The processor(s) of the device(s) that executes the resource manager are specifically configured and programmed to process the resource manager. The resource manager may have access to one or more network connections during its processing. The network connections can be wired, wireless, or a combination of wired and wireless.

In an embodiment, the device that executes the resource manager is cloud 110. In an embodiment, the device that executes the resource manager is server 110. In an embodiment, at least a portion of the resource manager is executed by a combination of devices 110, 120, 130, and/or 140. In an embodiment, the resource manager is resource manager 113, API 114, user interface 115, resources 123, cloud services 126, cloud app 133, and/or cloud services 143.

At 210, the resource manager renders a user interface 115 to an environment that includes resources 123. In an embodiment, the resources 123 include any of the above-mentioned example resources 123 discussed with system 100 of FIG. 1.

At 220, the resource manager receives resource configuration settings for the resources 123 from a user during a session. In an embodiment, the configuration settings include any of the above-mentioned example configuration settings discussed with system 100 of FIG. 1.

In an embodiment, at 221, the resource manager identifies in the configuration settings a certain resource 125 that user is requesting during the session to be deployed as multiple instances of the certain resource 125 within the environment. That is, the configuration settings are provided during a single session by the user through the user interface 115 and identify that certain resource 123 is to be deployed as multiple duplicated and concurrent instances of certain resource 123 within the environment. In an embodiment, the certain resource 123 is a pool of nodes, the pool of nodes is identified in the configuration settings as requesting deployment of multiple instances of the pool of nodes within the environment.

At 230, the resource manager translates the resource configuration settings into API calls associated with the environment. In an embodiment of 221 and 230, at 231, the resource manager causes a resource time out for the environment to be overridden to permit additional time to deploy the instances of the certain resource 123.

In an embodiment, at 232, the resource manager manages the API calls being directed to a low-level associated with resource management of the environment. In an embodiment, the low-level is a Kubernetes® API 124.

In an embodiment, at 233, the resource manager manages the API calls being directed to a third-party API 125 that interacts with a low-level API associated with resource management of the environment. In an embodiment, the third-party API is the GKER API and the low-level API is the Kubernetes® API 124.

At 240, the resource manager controls deployment, deletion, and reservation of the resources 123 using the API calls. In an embodiment, at 241, the resource manager monitors utilization of the resources 123 after the reservation and deployment of the resources 123 using a low-level API associated with the environment.

In an embodiment of 241 and at 242, the resource manager reserves and deploys new resources 123 within the environment based on user defined maximums and minimums set for resource utilization and based on 241. In an embodiment of 242 and at 243, the resource manager deletes existing resources 123 within the environment based on the maximums and minimums and based on 241.

In an embodiment, at 244, the resource manager auto scales the resources 123 based on monitoring of the resources 123. That is, the utilization of the resources is monitored for CPU usage, memory usage, storage usage, network bandwidth, and/or concurrent network connections.

In an embodiment, at 245, the resource manager maintains a management file with resource names for the resources 123 as the resources 123 are deployed and deleted from the environment. In an embodiment of 245 and at 246, the resource manager maintains the management file as a text file to manage the resources 123 and instances of the resources 123.

In an embodiment, at 250, the resource manager (210-240) processes as a front-end interface to a low-level API. The low-level API provides resource management for the resources 123 of the environment. In an embodiment of 250 and at 251, the resource manager (210-240) processes as a further front-end interface to a third-party API 125. The third-party API 125 interacts with the low-level API and performs resource management for the resources 123 in the environment.

FIG. 3 is a diagram of another method 300 for dynamic resource configuration, management, and control, according to an example embodiment. The software module(s) that implements the method 300 is referred to as a "distributed resource provisioner manager." The distributed resource provisioner manager is implemented as executable instructions programmed and residing within memory and/or a non-transitory computer-readable (processor-readable) storage medium and executed by one or more processors of one or more device(s). The processors that execute the distributed resource provisioner manager are specifically configured and programmed for processing the distributed resource provisioner manager. The distributed resource provisioner manager may have access to one or more network connections during its processing. The network connections can be wired, wireless, or a combination of wired and wireless.

In an embodiment, the device that executes the distributed resource provisioner manager is cloud 110. In an embodiment, the device that executes the distributed resource provisioner manager is a server 110. In an embodiment, at least a portion of the distributed resource provisioner manager is executed by a combination of devices 110, 120, 130, and/or 140. In an embodiment, the distributed resource provisioner manager is resource manager 113, API 114, user interface 115, resources 123, cloud services 126, cloud app 133, and/or cloud services 143. The distributed resource provisioner manager presents another and, in some ways, enhanced processing perspective from that which were discussed above for system 100 and method 200.

At 310, the distributed resource provisioner manager provides a user interface 115 to an API that manages resources 123 of an environment. In an embodiment, the API is one or any combination of APIs 124 and/or 125.

At 320, the distributed resource provisioner manager extends capabilities of the API by providing options within the user interface 115 that are unavailable with the API alone. That is, the API does not provide and does not permit features/functions associated with the extended capabilities, which are identified by the options of the user interface 115.

In an embodiment, at 321, the distributed resource provisioner manager provides a certain capability that permits deployment of multiple instances of a certain resource 123 within the environment during the session. In an embodiment of 321 and at 322, the distributed resource provisioner manager processes a loop function to reserve and deploy the multiple instances of the resources 123 within the environment during the session. In an embodiment, the loop function performs the pseudocode presented above with system 100 of FIG. 1.

In an embodiment of 322 and at 323, the distributed resource provisioner manager overrides, via the loop function, a resource reservation and deployment time out associated with one or more of the API and the environment. In an embodiment of 323 and at 324, the distributed resource provisioner manager maintains a management file to distinguish and to independently manage each of the multiple instances of the resources 123 within the environment.

At 330, the distributed resource provisioner manager controls deployment, deletion, and reservation/creation/initiation of the resources 123 within the environment based on configuration settings received from the user through the user interface 115 during a session with the user. The manner in which the deployment, deletion, reservation/creation/initiation is performed was discussed above with system 100 of FIG. 1.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
   providing a user interface to an application programming interface (API) that manages resources of an environment;
   extending capabilities of the API by providing options within the user interface that are unavailable with the API; and
   controlling deployment, deletion, and reservation of the resources within the environment based on configuration settings received from a user through the user interface during a session with the user.

2. The method of claim 1, wherein extending further includes providing a certain capability that permits deployment of multiple instances of a certain resource within the environment during the session.

3. The method of claim 2, wherein providing a certain capability further includes processing a loop function to reserve and deploy the multiple instances within the environment during the session.

4. The method of claim 3, wherein processing further includes overriding via the loop function a resource reservation and deployment time out associated with one or more of the API and the environment.

5. The method of claim 4, wherein overriding further includes maintaining a management file to distinguish and manage each of the multiple instances independently within the environment.

6. A system, comprising:
   at least one server comprising a processor and a non-transitory computer-readable storage medium;
   the non-transitory computer-readable storage medium comprises executable instructions; and
   the executable instructions when executed on the processor cause the processor to perform operations comprising:
   providing a user interface to a third-party API and a low-level API, wherein the third-party API and the low-level API are associated with managing resources of an environment;
   extending at least one capability of the third-party API by providing at least one option within the user interface that is unavailable with the third-party API; and
   controlling deployment, deletion, and reservation of the resources within the environment based on settings received from a user through the user interface during a session with the user.

7. The system of claim 6, wherein the environment is a cloud, wherein the resources provide microservices to enterprise servers, wherein the microservices comprise one or more of transaction services, security services, inventory services, and customer loyalty services.

* * * * *